United States Patent [19]

Sugiura et al.

[11] Patent Number: 4,823,377
[45] Date of Patent: Apr. 18, 1989

[54] SYSTEM FOR SETTING REGISTRATION MODE FOR KEY TELEPHONE SET

[75] Inventors: Ryuzo Sugiura; Kenichi Kanno, both of Tokyo; Hisami Ojima, Kanagawa, all of Japan

[73] Assignee: Tamura Electric Works, Ltd., Tokyo, Japan

[21] Appl. No.: 114,407

[22] Filed: Oct. 28, 1987

[30] Foreign Application Priority Data

Oct. 29, 1986 [JP] Japan .................................. 61-255797

[51] Int. Cl.$^4$ .............................................. H04M 1/00
[52] U.S. Cl. ...................................... 379/156; 379/165
[58] Field of Search ............... 379/156, 157, 158, 159, 379/160, 164, 165

[56] References Cited

U.S. PATENT DOCUMENTS

| | | | |
|---|---|---|---|
| 4,032,724 | 6/1977 | Matheny | 379/159 |
| 4,491,693 | 1/1985 | Sano et al. | 379/156 |
| 4,559,417 | 12/1985 | Komuro et al. | 379/157 |
| 4,602,132 | 7/1986 | Nagatomi et al. | 379/159 |

Primary Examiner—Jin F. Ng
Assistant Examiner—Wing F. Chan
Attorney, Agent, or Firm—Blakely, Sokoloff, Taylor & Zafman

[57] ABSTRACT

A key telephone system includes a main unit, a DSS interface, and a detector. The main unit includes a speech path switch, a plurality of call processing interfaces, an operating data memory, operation mode setting switches, and a controller for controlling the speech path switch by referring to the operating data memory when data transmission is periodically performed between the plurality of key telephone sets through the call processing interface in the call processing mode, and for updating contents of the operating data memory according to operating data externally input in the data setting mode. The DSS interface connects at least one DSS console. The detector detects that first normal data received, after a periodic data transmission with the DSS console through the DSS interface is an abnormal transmission for a predetermined period of time, is data unique to the key telephone set. The controller controls the operation mode setting switches in association with an output from the detector to change the call processing mode into the data setting mode.

9 Claims, 5 Drawing Sheets

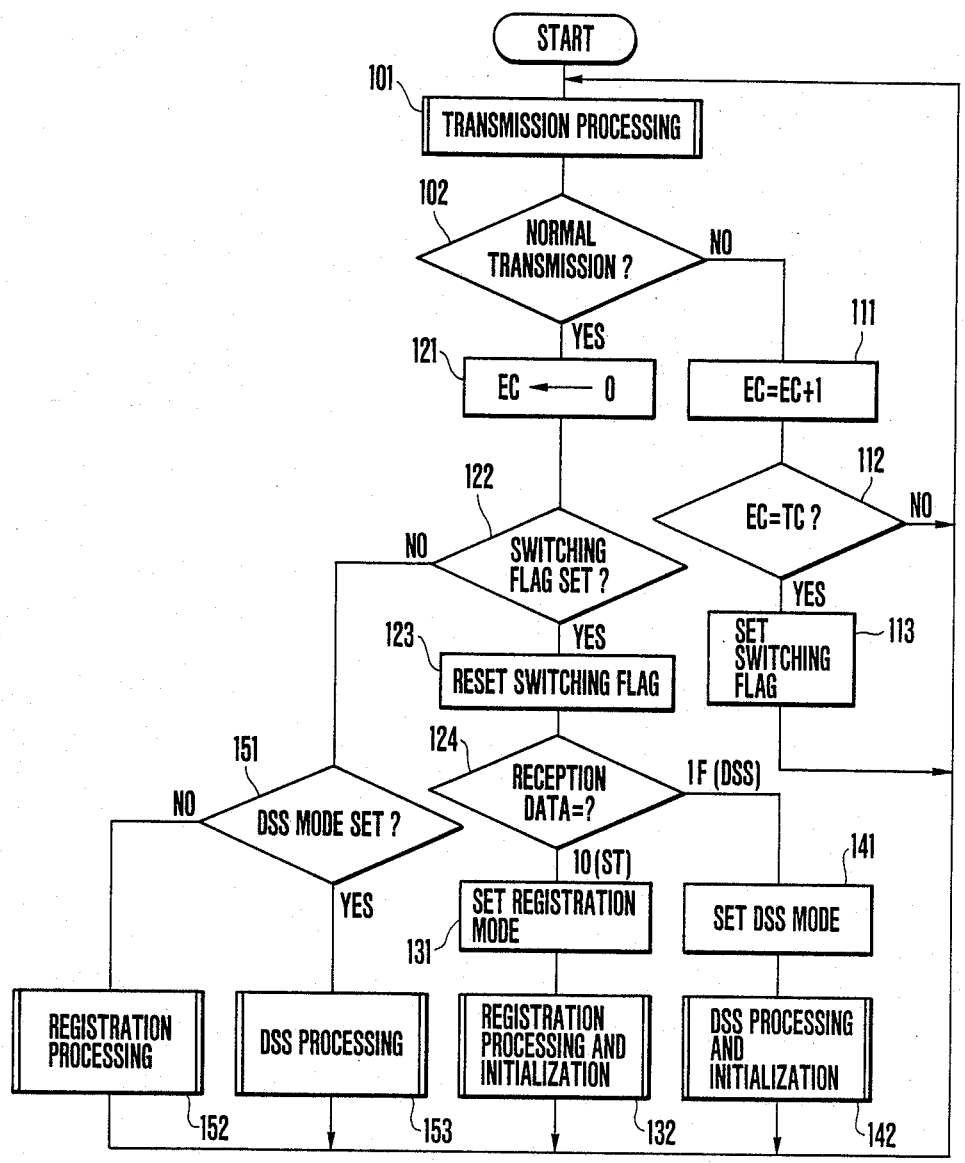
F I G. 1

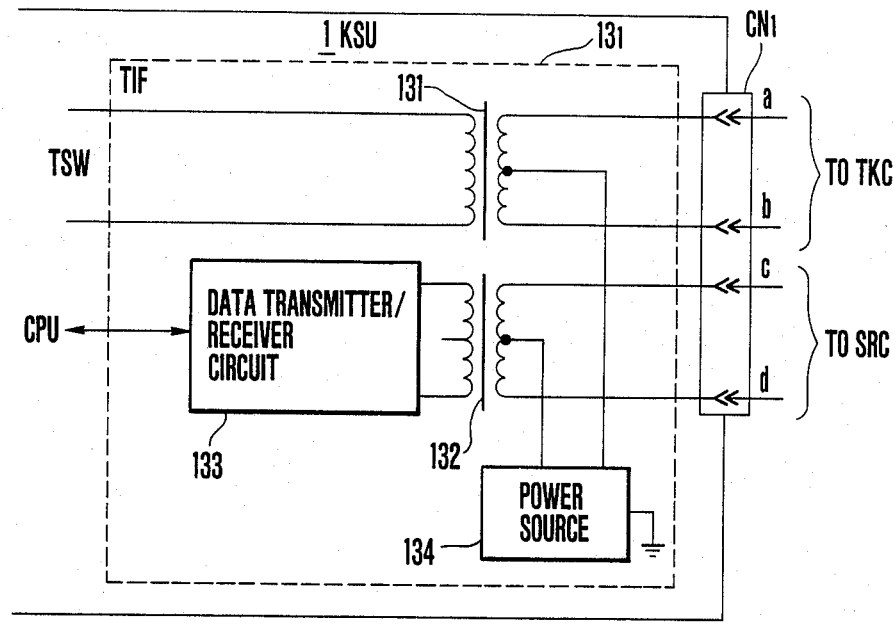
F I G. 6 (a)
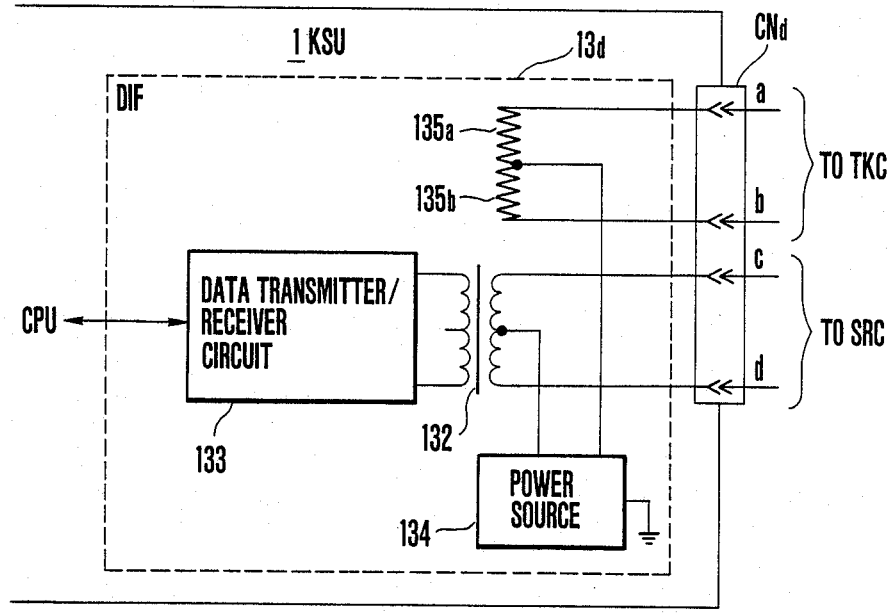
F I G. 6 (b)

SYSTEM FOR SETTING REGISTRATION MODE FOR KEY TELEPHONE SET

BACKGROUND OF THE INVENTION

The present invention relates to a system for setting a registration mode for setting a registration state of operating data in a key telephone set including a connecting means for a direct station selection console and adapted to register operating data for controlling the operating state.

In a conventional key telephone set, operating data such as incoming/outgoing call restriction data and office line type data (DP/PB and CO/PBX) are stored in a memory. The contents of the memory are read out during operation to discriminate switching control. In order to register and store such operating data in the memory, a registration mode is set upon depression of keys of a predetermined key telephone set, and various types of operating data are registered in the memory.

In order to prevent setting of the registration mode upon accidental key input operations and accidental updating of the operating data, an operating data registration connector or terminal is provided, or an operating data registration mode switch is arranged in a main unit, as described in U.S. Pat. No. 4,491,693.

Along with an increase in the number of telephone networks, a demand has arisen for smoothly transferring an incoming call from an office line or simultaneously calling all key telephone sets. For this purpose, a direct station selection console having a function for displaying states of all telephone sets and a function of one-touch dialing is connected to the main unit, so that a telephone operator or an assistant telephone operator uses the direct station selection console together with an attendant key telephone set connected to the main unit.

If the registration connector or terminal is arranged, the number of components is increased, and the circuit arrangement is complicated, resulting in high cost. Where the registration mode switch is arranged, the number of components is increased, and a user must go to a location of the main unit prior to registration operations, resulting in inconvenience.

SUMMARY OF THE INVENTION

It is, therefore, a principal object of the present invention to provide a registration mode setting system in a key telephone set, wherein accidental setting of the registration mode can be perfectly prevented.

It is another object of the present invention to provide a simple, inexpensive registration mode setting system for a key telephone set.

In order to achieve the above objects of the present invention, there is provided a key telephone system comprising a main unit including: a speech path switch for selectively switching between at least one office line and a plurality of key telephone sets; a plurality of call processing interfaces connected between the speech path switch and the plurality of key telephone sets; an operating data memory for storing operating data required for operating the system; operation mode setting means for setting an operation mode of the system in one of a call processing mode and a data setting mode; and control means for controlling the speech path switch by referring to the operating data memory when data transmission is periodically performed with the plurality of key telephone sets through the call processing interface in the call processing mode, and for updating contents of the operating data memory according to operating data externally input in the data setting mode, wherein the system further comprises a DSS interface for connecting at least one DSS console to perform periodical data transmission and first detecting means for detecting that first normal data received, after a periodic data transmission with the DSS console through the DSS interface is an abnormal transmission for a predetermined period of time or more, is data unique to the key telephone set, and the control means controls the operation mode setting means in association with an output from the detecting means to change the call processing mode into the data setting mode.

BRIEF DESCRIPTION OF THE DRAWINGS

FIG. 1 is a flow chart showing control sequences according to an embodiment of the present invention;

FIGS. 6 (a) and 6 (b) are circuit diagrams of a TIF (telephone set interface) and a DIF (direct station selection console interface) shown in FIG. 2, respectively.

DESCRIPTION OF THE PREFERRED EMBODIMENTS

Preferred embodiments of the present invention will be described hereinafter.

Figure 2:
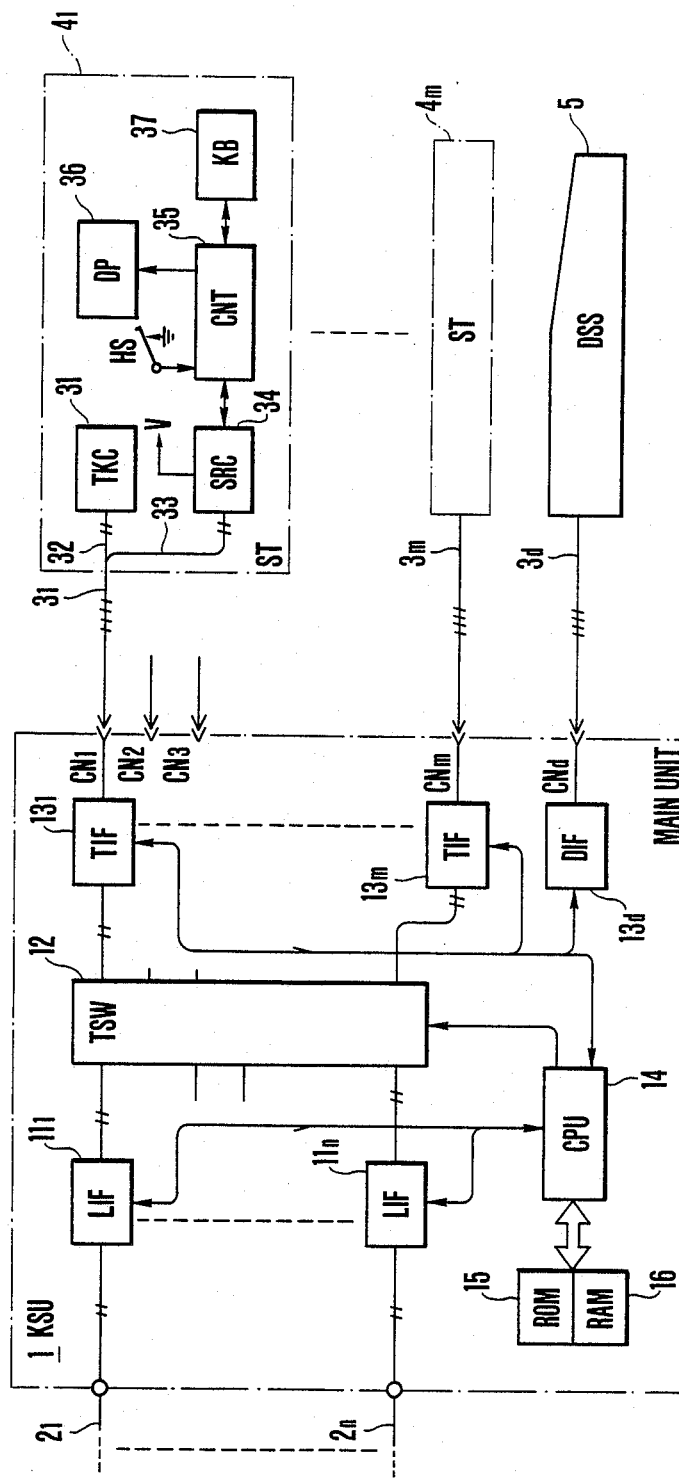
FIG. 2 is a block diagram showing an overall arrangement of a registration mode setting system for a key telephone set according to the embodiment of the present invention.

FIG. 2 shows the overall arrangement of a registration mode setting system for a key telephone set. A main unit (to be referred to as a KSU hereinafter) 1 is connected to central office lines or PBX lines $2_l$ to $2_n$. The main unit 1 is also connected to key telephone sets (to be referred to as STs hereinafter) $4_l$ to $4_m$ and a DSS 5 through 4-pin or 4-terminal connectors $CN_l$ to $CN_m$ and $CN_d$, the pin positions of which are determined by storage positions, and lines $3_l$ to $3_m$ and $3d$ each consisting of a pair of speech lines and a pair of signal lines. The ST $4_m$ is used together with the DSS as an attendant telephone set. The office lines $2_l$ to $2_n$ are connected to a speech path switch (to be referred to as a TSW hereinafter) 12 through line interfaces (to be referred to as LIFs hereinafter) $11_l$ to $11_n$. The TSW 12 and the lines $3_l$ to $3_m$ from the STs $4_l$ to $4_m$ are connected to through telephone set interfaces (to be referred to as TIFs hereinafter) $13_l$ to $13_m$ and are switched by analog switches in the TSW 12 or crossing points such as relay contacts. The DSS 5 is connected to a DSS interface (to be referred to as a DIF hereinafter) $13d$ and exchanges data signals therewith.

The LIFs $11_l$ to $11_n$ have functions such as incoming call detection, formation of a DC loop with the office lines, holding, and dialing using a pulse signal or a composite voice frequency signal. The TSW 12 has a switching function between the office lines $2_l$ to $2_n$ and the STs $4_l$ to $4_m$ and between the STs $4_l$ to $4_m$. The TIFs $13_l$ to $13_m$ supply a speech power source voltage to the STs $4_l$ to $4_m$ through the speech lines, data signals thereto through the signal lines, and a control power source voltage thereto. The DIF 13d supplies a power source voltage to the DSS 5 through the signal lines and exchanges a data signal with the DSS 5.

A controller in the KSU 1 comprises a processor (to be referred to as a CPU hereinafter) 14 such as a microprocessor, a permanent memory (to be referred to as a ROM hereinafter) 15, and a volatile memory (to be referred to as a RAM hereinafter) 16. Programs stored in the ROM 15 are executed by the CPU 14, and predetermined processed data is stored in the RAM 16. The controller performs control discrimination on the basis of incoming call detection outputs from the LIFs $11_l$ to $11_n$ and operation data from the STs $4_l$ to $4_m$ through the TIFs $13_l$ to $13_m$. At the same time, the controller controls the LIF $11_l$ to $11_n$, TSW 12 and TIF $13_l$ to $13_m$, and sends control data through the TIFs $13_l$ to $13_m$ to control the STs $4_l$ to $4_m$.

In each of the STs $4_l$ to $4_m$, a speech circuit (to be referred to as a TKC hereinafter) 31 is connected to speech lines 32. A small controller (to be referred to as a CNT hereinafter) 35 having the same arrangement as in the CPU 14, the ROM 15, and the RAM 16 but has a size smaller than the controller including these elements is connected to signal lines 33 through a transmitter circuit (to be referred to as an SRC hereinafter) 34. The CNT 35 controls a digital display (to be referred to as a DGP hereinafter) in a display circuit (to be referred to as a DP hereinafter) 36, a tone generator, and an amplifier. Information is displayed on the DGP and a ringing tone is produced at a loudspeaker on the basis of control data generated through the SRC 34. The CNT 35 also controls the ON/OFF operation and flickering of each indicator in a keyboard (to be referred to as a KB hereinafter) 37 on the basis of the control data. In addition, the CNT 35 sends operation data through the SRC 34 in accordance with operations of the buttons in the KB 37 and a hook switch HS.

The SRC 34 has a power source separation function. It extracts and stabilizes a power source voltage supplied from the KSU 1 through the signal lines 33, and supplies a local voltage V to components requiring the local voltage.

When one of the STs 4 is set in the off-hook state, the corresponding operation data is fetched by the CPU 14. Data representing key input operations in the KB 37 are also fetched by the CPU 14. The CPU 14 controls the TSW 12 in accordance with depression of an office line button or an extension button or dialing keys, thereby performing switching. In this case, if a call is an office line call, dialing is performed under the control of the selected LIF 11. However, if extension dialing is performed, an extension ringing tone is produced under the control of the DP 36 for the destination ST 4. Upon answering at the destination ST 4, a busy state can be set.

Incoming calls from the office lines $2_l$ to $2_n$ are respectively detected by the LIFs $11_l$ to $11_n$, and the CPU 14 controls the DPs 36 in the STs $4_l$ to $4_m$. In order to transmit office line ringing tones, if any ST 4 is set in the off-hook state, the CPU 14 controls the TSW 12, thereby forming a speech path.

At the same time, the indicator lamps in the KB 37 are controlled, and the corresponding indicator lamps are turned on.

Figure 3:
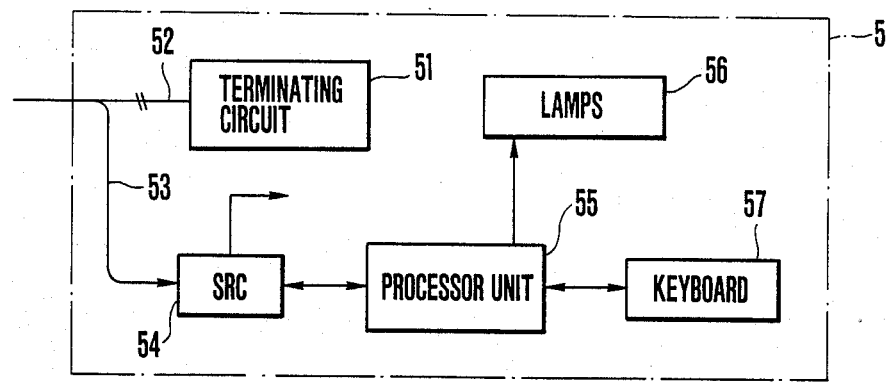
FIG. 3 is a block diagram showing a detailed arrangement of a DSS (direct station selection console) shown in FIG. 2.

FIG. 3 is a block diagram showing an internal arrangement of the DSS 5. A terminating circuit 51 including a resistor and the like is connected to speech lines 52. A processor unit 55 is connected to signal lines 53 through an SRC 54 having the same arrangement of the SRC (transmitter circuit) in the ST 4. Reference numerals 56 denote lamps; and 57, a keyboard. Data transmitted from the KSU 1 through the SRC 54 is decoded and the operations of the lamps 56 are controlled. The data input at the keyboard 57 is sent to the KSU 1 through the SRC 54 under the control of the processor unit 55.

Figure 4:
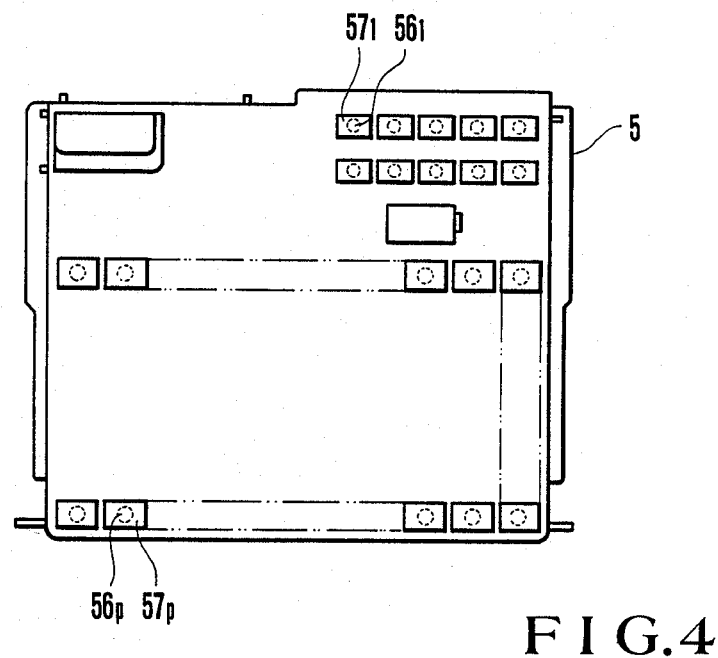
FIG. 4 is a plan view of the DSS shown in FIG. 3.

FIG. 4 is a plan view of the DSS 5. The panel of the DSS 5 includes self-illuminating keys $57_l$ to $57_p$ corresponding to the STs $4_l$ to $4_m$ and function keys including an inter-call key, a general-call key, and the like. Lamps $56_l$ to $56_p$ are built into the keys $57_l$ to $57_p$, respectively. Upon operation of each key, the corresponding operation data is sent from the operated key, and control data is received thereby. The lamp of the depressed key is turned on/off or flickers on the basis of the control data. A telephone operator or an assistant telephone operator uses, e.g., the ST $4_m$ as a telephone set attached to the DSS 5 and transfers an office line incoming call after holding it or performs group calling or the like.

As described above, FIG. 4 is a plan view of the DSS 5, and the panel includes the keys $57_l$ to $57_p$ including function keys (e.g., a general-call key) in addition to keys respectively corresponding to the STs $4_l$ to $4_m$. The keys $57_l$ to $57_p$ are self-illuminating keys, and the lamps $56_l$ to $56_p$ are respectively built into the keys $57_l$ to $57_p$.

With the above arrangement, data are sequentially, repeatedly exchanged between the KSU 1 and the STs $4_l$ to $4_m$ and between the KSU 1 and the DSS 5 every cycle of 40 ms under the control of the KSU 1. The operation data is sent back as a response signal upon transmission of the control data to the DSS 5. When no key operation is performed, operation data representing no operation is sent back to the DSS 5.

Figure 5:
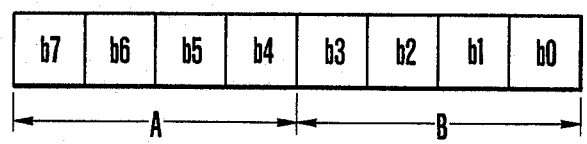
FIG. 5 is a bit data format of operation data.

The operation data has the following 8-bit signal format. The operation data consists of upper 4 bits A respresented by b4 to b7 and lower 4 bits B represented by b0 to b3, as shown in FIG. 5. The most significant bit b7 represents a state of the hook switch HS. A state of each key is represented by the following seven bits b0 to b6. If the telephone set is set in the off-hook state, the bit 7 is set at logic "1". Otherwise, it is set at logic "0". This hook code is repeatedly transmitted, while a key code represented by the bits b0 to b6 is transmitted once.

TABLE 1

| Unit | | Non-Operated State | Operated State |
|---|---|---|---|
| Direct Station Selection Console (DSS) | | 0001 1111 = 1F | 0101 1001 = 59 |
| Key Telephone Set | On-Hook | 0001 0000 = 10 | 0011 0110 = 36 |
| | Off-Hook | 1001 0000 = 90 | 1011 0110 = B6 |

The contents of the operation code are defined as shown in Table 1. The code sent from the DSS does not include the bit for the hook switch HS, so that the most significant bit b7 is always set at logic "0". In the non-operated state of the ST, the code in the on-hook state of each of the STs $4_l$ to $4_m$ is "10"$_{hex}$ (where hex represents hexadecimal notation) and in the off-hook state is "90"$_{hex}$. The corresponding code from the DSS 5 is represented by "1F"$_{hex}$. Even in the operated state, the codes corresponding to those described above are represented by "59"$_{hex}$, "36"$_{hex}$, and "B6"$_{hex}$. In the non-operated state, "1F"$_{HEX}$ and "10"$_{HEX}$ of the DSS and ST respectively without any key operation are non-key code data. Data indicating the operated state are called key code data. By analyzing the contents of the codes, the states of the DSS and the ST can be determined. At the same time, by the operation data reception failure or the like, a transmission abnormality of the corresponding circuit is determined by the CPU 14.

In order to register operating data in the operating data memory allocated in a specific area of the RAM 16, the DSS 5 is disconnected from the connector CN$_d$, and any ST 4 is connected to the connector CN$_d$. The CPU 14 determines data transmission interruption of 0.5 sec or more and hence the transmission abnormality. Thereafter, the signal lines between the ST 4 and the DSS 5 are connected to the connector CN$_d$, and normal data transmission with the ST 4 is performed. The first normal operation data is detected as that output from the ST 4, and the registration mode is then set by the CPU 14. Therefore, the operating data from the ST 4 connected to the connector CN$_d$ can be freely registered. Upon completion of the registration operation, the DSS 5 is connected to the connector CN$_d$ again, and then the registration mode is canceled. Accidental setting of the registration mode and updating of the operating data can be perfectly prevented.

After the operating data is registered, the operating data memory in the RAM 16 is referred when the CPU 14 performs control using the operating data. Therefore, the CPU 14 can perform control on the basis of the contents of the operating data memory.

Connection interchangeability of the connector can be achieved by methods shown in FIGS. 6 (a) and 6 (b). FIG. 6 (a) shows the main part of the TIF 13$_l$ connected to CN$_l$ of the connectors CN$_l$ to CN$_m$. The TKC 31 in the ST 4$_l$ is connected to the TSW 12 in the KSU 1 through a transformer 131. The SRC 34 in the ST 4$_l$ is connected to the CPU 14 in the KSU 1 through a data transmitter/receiver circuit 133 and a transformer 132. A DC voltage of 24 V from a power source 134, is applied to the center taps of the secondary windings of the transformers 131 and 132.

FIG. 6 (b) shows the main part of the DIF 13$d$ connected to the connector CN$_d$. The transformer 131 is replaced with a series circuit of resistors 135$a$ and 135$b$. Although the power source 134 is connected to the center tap of the transformer 131 in the arrangement of FIG. 6 (a), a power source 134 is connected to a connecting point between the resistors 135$a$ and 135$b$ in FIG. 6 (b).

With the above arrangement, even if the ST 4$_l$ is connected to the connector CN$_d$, data exchange between the data transmitter/receiver circuit 133 and the SRC 34 of the ST 4$_l$ can be performed without failure.

FIG. 1 is a flow chart showing a control state of the CPU 14 for data transmission. The CPU 14 receives the operation data and transmits control data through the DIF 13$d$ and the connector CN$_d$ in step 101 "Transmission Processing". The CPU 14 determines according to a reception state of the operation data whether transmission is normal, i.e., "Normal Transmission?" in step 102. If the DSS 5 is disconnected from the connector and if N (NO) in step 102, a count value EC of an error counter arranged in the CPU 14 is incremented in "EC=EC+1" in step 111. The CPU 14 then checks whether the count value reaches a predetermined value TC corresponding to a predetermined period of time, i.e., "EC=TC?" in step 112. If N in step 112, the operations in step 101 and the subsequent steps are repeated every 40 msec. If Y (YES) in step 112, after the CPU 14 instructs to "Set Switching Flag" in step 113, the operations in step 101 and the subsequent steps are repeated.

If Y in step 102, i.e., the ST 4 is connected to the connector CN$_d$, the error counter is cleared in "EC 0" in step 121. In correspondence with step 113, the CPU 14 checks whether the switching flag is set, i.e., "Switching Flag Set?" in step 122. If Y in step 122, the CPU 14 instructs to "Reset Switching Flag" in step 123. The CPU 14 determines whether the normal operation data sent after Y of step 102 is data unique to an ST 4 according to "Reception Data=?" in step 124.

If detection in step 124 represents "10"$_{hex}$, the operation data is sent from an ST 4. The CPU 14 instructs to "Set Registration Mode" in step 131 and sets a state in which the key operation data at the ST 4 is received as operating data. In order to store the received operating data in the operating data memory in the RAM 16, initialization of the necessary components is performed in "Registration Processing and Initialization" in step 132. The operations in step 101 and the subsequent steps are then repeated.

However, if the detection in step 124 represents "1F"$_{hex}$, data is output from the DSS 5. In this case, the CPU 14 instructs to "Set DSS Mode" in step 141 to prepare for reception of the operation data from the DSS 5. "DSS Processing and Initialization" in step 142 are performed for the required components.

When the operations in steps 131 and 132 are performed and the operating data is supplied to the ST 4 connected to the connector CN$_d$, the CPU 14 checks whether the DSS mode is set, i.e., "DSS Mode Set?" in step 151 in correspondence with the operation in step 141. Since N in step 151, "Registration Processing" in step 152 is performed, and new operating data is updated and stored in the operating data memory. After the CPU 14 performs on-hook detection, it performs processing for restoring the call processing mode.

If the operations in steps 141 and 142 are completed, the decision block in step 151 becomes Y, and "DSS Processing" in step 153 is performed. In this case, the operating data from the DSS 5 is analyzed, and control is performed on the basis of the analysis result. In addition, control data is sent to the DSS 5.

When the DSS 5 is detached from the connector CN$_d$, and an ST 4 is attached thereto in place of the DSS 5, a nonconnection state necessarily continues for a predetermined period of time (0.5 sec) or more. In this state, the decision in step 112 becomes Y. When the transmission abnormality is eliminated and normal data is sent from the ST 4, the registration mode is automatically set in response to this first normal data.

When the registration operation is completed and the ST 4 is detached from the connector CN$_d$ and the DSS 5 is connected thereto, a transmission abnormality occurs for the predetermined period of time or more in the same manner as described above. The decision in step 112 becomes Y. When the normal data is sent from the DSS 5, the DSS mode is automatically set in response to the first normal data. At the same time, the registration mode is canceled.

An accidental transmission abnormality occurring while the connector CN$_d$ is connected to the DSS 5 or the ST 4 continues less than a predetermined period of time. In this case, Y in step 102 is obtained while N in step 122. Since N in step 122 is obtained, the operation in step 152 or 153 is performed. No failure occurs in the operation and display of the DSS 5 or the registration operations at the ST 4.

Figure 7:
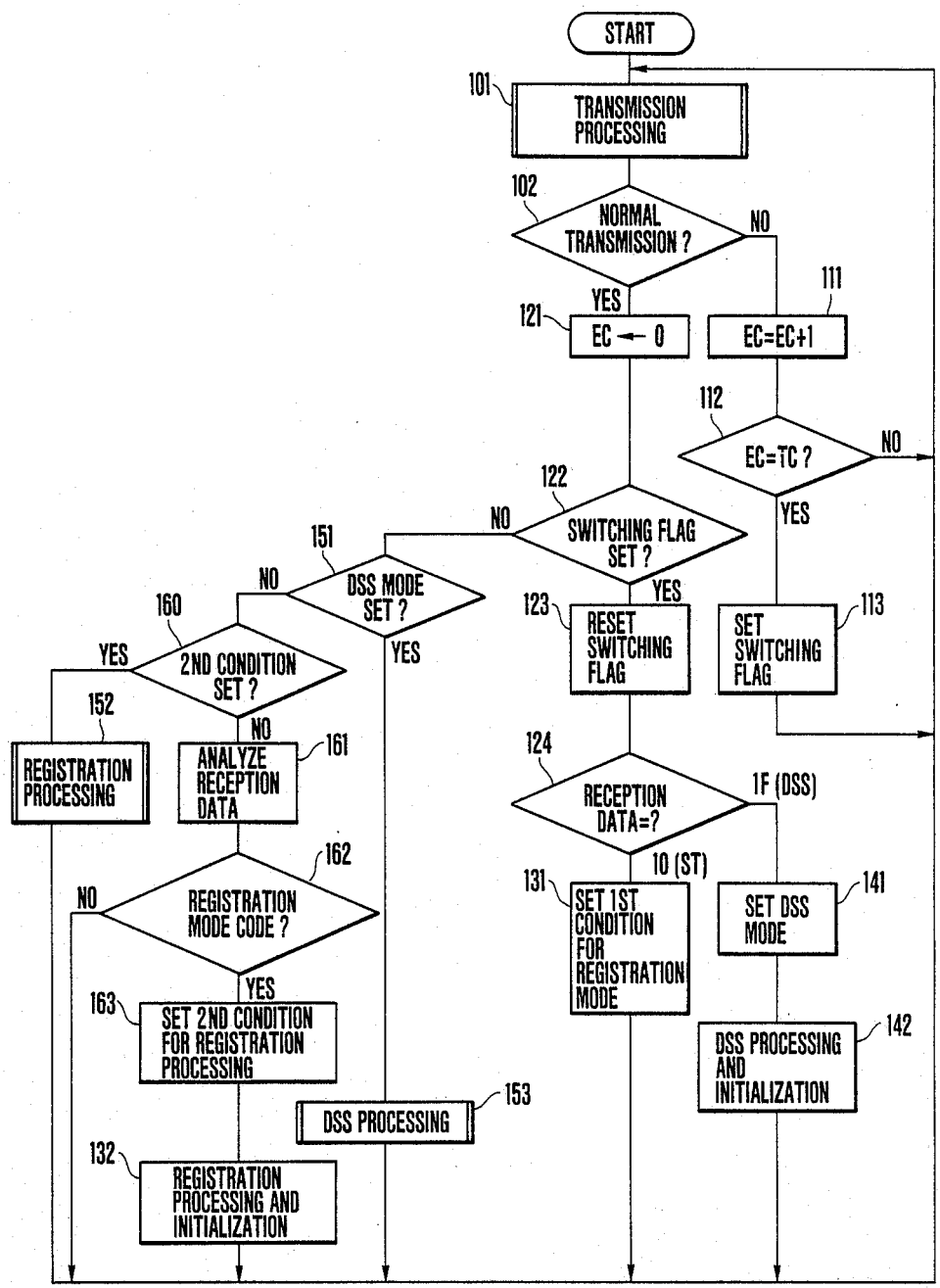
FIG. 7 is a flow chart showing a control state according to another embodiment of the present invention.

FIG. 7 is a flow chart showing another embodiment of the present invention. The operations in steps 101, 102, 111, 112, 113, 121, 122, 123, 124, 141, 142, 151, and 153 are the same as those in FIG. 1. When a transmission abnormality occurs, the CPU 14 instructs to "Set Switching Flag" when the count value EC of the error counter reaches TC corresponding to a predetermined period of time. Thereafter, when the switching flag is set upon restoration of the normal transmission, the reception data is discriminated in step 124. If the discriminated data is the one from the DSS, the CPU 14 instructs to "Set DSS Mode" in step 141. If the switching flag is determined not to be set in step 122 and the DSS mode is determined to be set in step 122, the operation in step 153 is performed.

When the reception data is determined in step 124 to be sent from an ST, the CPU 14 instructs to "Set First Condition for Registration Mode" in step 131, thereby preparing for reception of the key operation data from the ST 4 through the connector $CN_d$ and the DIF 13d as the operating data. The flow returns to step 101. In this case, since the switching flag has already been reset, the decision in step 122 becomes N. Since the DSS mode is not yet set, the decision in step 151 also becomes N. The CPU determines N in the "Second Condition Set?" in step 160. The CPU 14 performs "Reception Data Analysis" in step 161 and determines "Registration Mode Code?" in step 162. When the decision in step 162 becomes Y, the CPU 14 instructs to "Set Second Condition for Registration Mode" in step 163. In order to store the operating data received in "Registration Processing and Initialization" in step 132 in the operating data memory in the RAM 16, the CPU 14 instructs to initialize the required components, and then the flow returns to step 101.

The decision in "Second Condition Set?" in next step 160 becomes Y due to the second condition set in step 163. New operating data is updated and stored in the operating data memory in the RAM 16 by "Registration Processing" in step 152. In the same manner as in FIG. 1, when the DSS 5 is detached from the connector $CN_d$ and an ST 4 is attached thereto instead, the nonconnecting state of the predetermined period of time (0.5 sec) or more continues. The decision in step 112 becomes Y. Thereafter, when the normal transmission state is restored and the normal transmission data is sent from the ST 4, the registration mode is automatically set in response to the first normal data.

When the ST 4 is detached from the connector $CN_d$ upon completion of the registration operation and the DSS 5 is attached thereto, a transmission abnormality of a predetermined period of time or more occurs in the same manner as described above. The decision in step 112 becomes Y. Thereafter, when the first normal data is sent from the DSS 5, the DSS mode is automatically set in response thereto, and at the same time, the registration mode is canceled.

Since first and second conditions for the registration mode are discriminated in steps 131 and 163 as a double guard, erroneous data updating such as an operation error can be prevented.

The connector $CN_d$ and the DSS 5 are normally connected through house wiring. A connector identical with the connector $CN_d$ is arranged near the installation position of the DSS 5. In particular, the DSS 5 or ST 4 can be easily attached/detached and the operator need not go to the installation position of the KSU 1.

The registration mode can be automatically set/reset without adding parts and circuits. At the same time, accidental setting of the registration mode and accidental updating of the operating data can be perfectly prevented.

The connectors $CN_l$ to $CN_m$ and $CN_d$ are preferably modular connectors, but may be 4-pin detachable connectors of an identical model, or other connectors or terminals. The data transmission format between the KSU 1 and the STs $4_l$ to $4_m$ and between the KSU 1 and the DSS 5 is not limited to the specific one described above. Any periodic transmission format which allows discrimination of the STs $4_l$ to $4_m$ from the DSS 5 may be used. Other various changes and modifications may be made within the spirit and scope of the invention.

According to the present invention as described above, the registration mode can be automatically set by simply connecting the ST to the connecting means of the DSS. Additional parts and circuits need not be used, and the registration mode setting system can be arranged at low cost. At the same time, accidental setting of the registration mode can be perfectly prevented. Therefore, the present invention can be effectively used in various key telephone sets requiring registration of the operating data.

What is claimed is:

1. A key telephone system comprising a main unit including:
    a speech path switch for selectively switching between at least one office line and a plurality of key telephone sets;
    a plurality of calling processing interfaces connected between said speech path switch and said plurality of key telephone sets;
    an operating data memory for storing operating data required for operating said system;
    operation mode setting means for setting an operation mode of said system in one of a call processing mode and a data setting mode; and
    control means for controlling said speech path switch by referring to said operating data memory when data transmission is periodically performed with said plurality of key telephone sets through said calling processing interfaces in the call processing mode, and for updating contents of said operating data memory according to operating data externally input in the data setting mode,
    wherein said system further comprises a direct station selection interface for connecting at least one direct station selection console to perform periodical data transmission and first detecting means for detecting that first normal data received, after a periodic data transmission with said direct station selection console through said direct station selection interface is an abnormal transmission for at least a predetermined period of time is data unique to said key telephone set, and
    said control means controls said operation mode setting means in association with an output from said detecting means to change the call processing mode into the data setting mode.

2. A system according to claim 1, wherein said control means controls said operation mode setting means and sets the data setting mode as soon as the output from said detecting means is generated.

3. A system according to claim 1, further comprising second detecting means for detecting predetermined key code data from said key telephone set connected to said direct station selection interface, and wherein said control means controls said operation mode setting means in response to sequential outputs from said first and second detecting means.

4. A system according to claim 3, wherein the predetermined key code data comprises off-hook data and a plurality of key data following the off-hook data.

5. A system according to claim 1, wherein said first detecting means detects an interruption of the data transmission for a predetermined period of time or more as a data transmission abnormality.

6. A system according to claim 1, wherein said direct station selection console or said key telephone set which is connected to said direct station selection interface periodically transmits one of non-key code data and key code data.

7. A system according to claim 6, wherein the hook code is periodically added to the non-key code data and the key code data.

8. A system according to claim 6, wherein the non-key code data from said direct station selection console has code data different from that of the non-key code data from said key telephone set, and said first detecting means detects that the non-key code data from said key telephone set is the data unique to said key telephone set.

9. A system according to claim 1, wherein a 4-terminal connector for a pair of speech lines and a pair of signal lines is used to selectively connect said direct station selection interface and said DSS console or said direct station selection interface and said key telephone set.

* * * * *

UNITED STATES PATENT AND TRADEMARK OFFICE
CERTIFICATE OF CORRECTION

PATENT NO. : 4,823,377
DATED : 04/18/89
INVENTOR(S) : Sugiura et al.

It is certified that error appears in the above—identified patent and that said Letters Patent is hereby corrected as shown below:

Col. 04, line 41 delete "respresented" insert --represented--

Signed and Sealed this

Second Day of October, 1990

Attest:

HARRY F. MANBECK, JR.

*Attesting Officer*     *Commissioner of Patents and Trademarks*